United States Patent Office 2,722,189
Patented Nov. 1, 1955

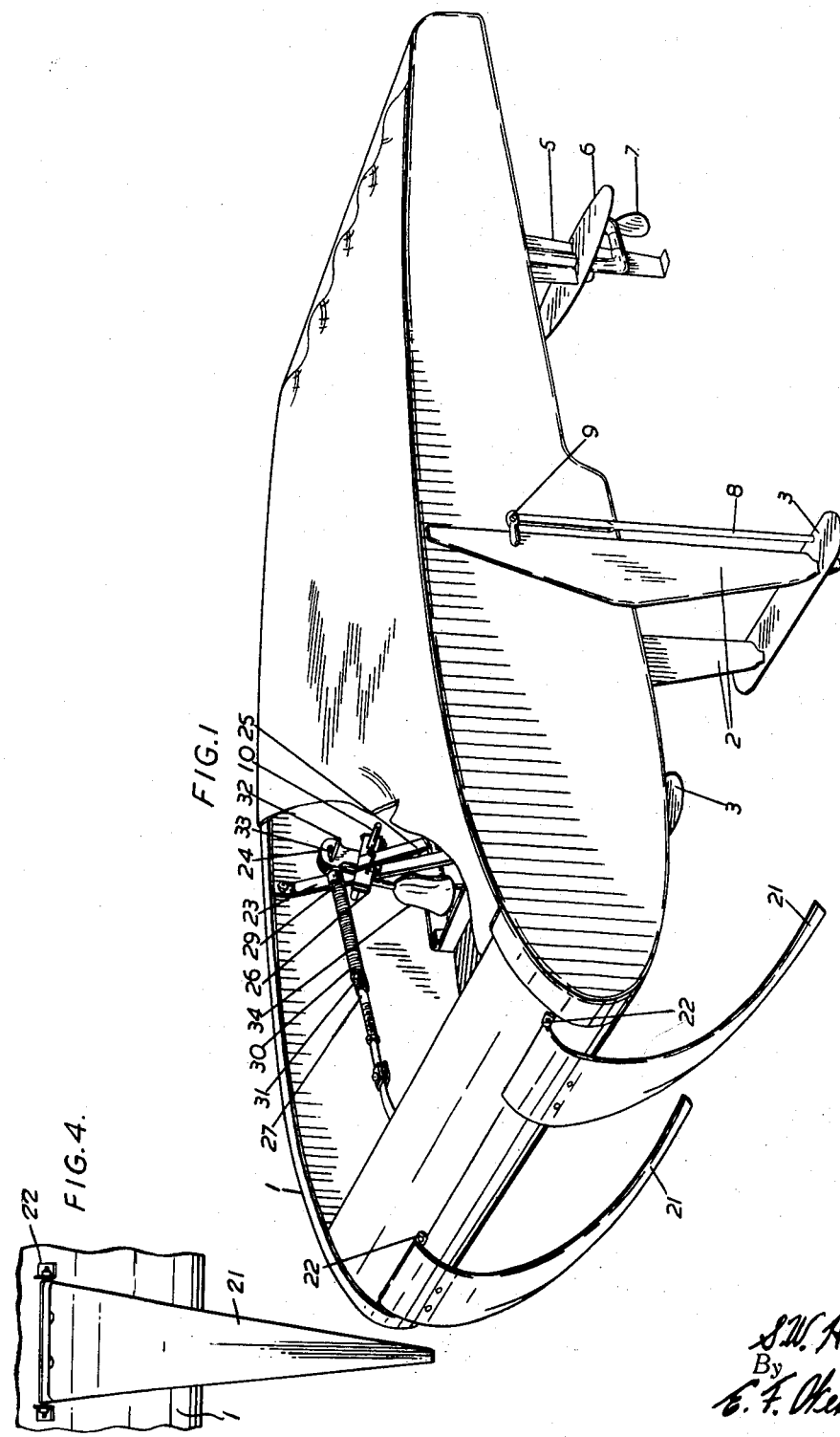

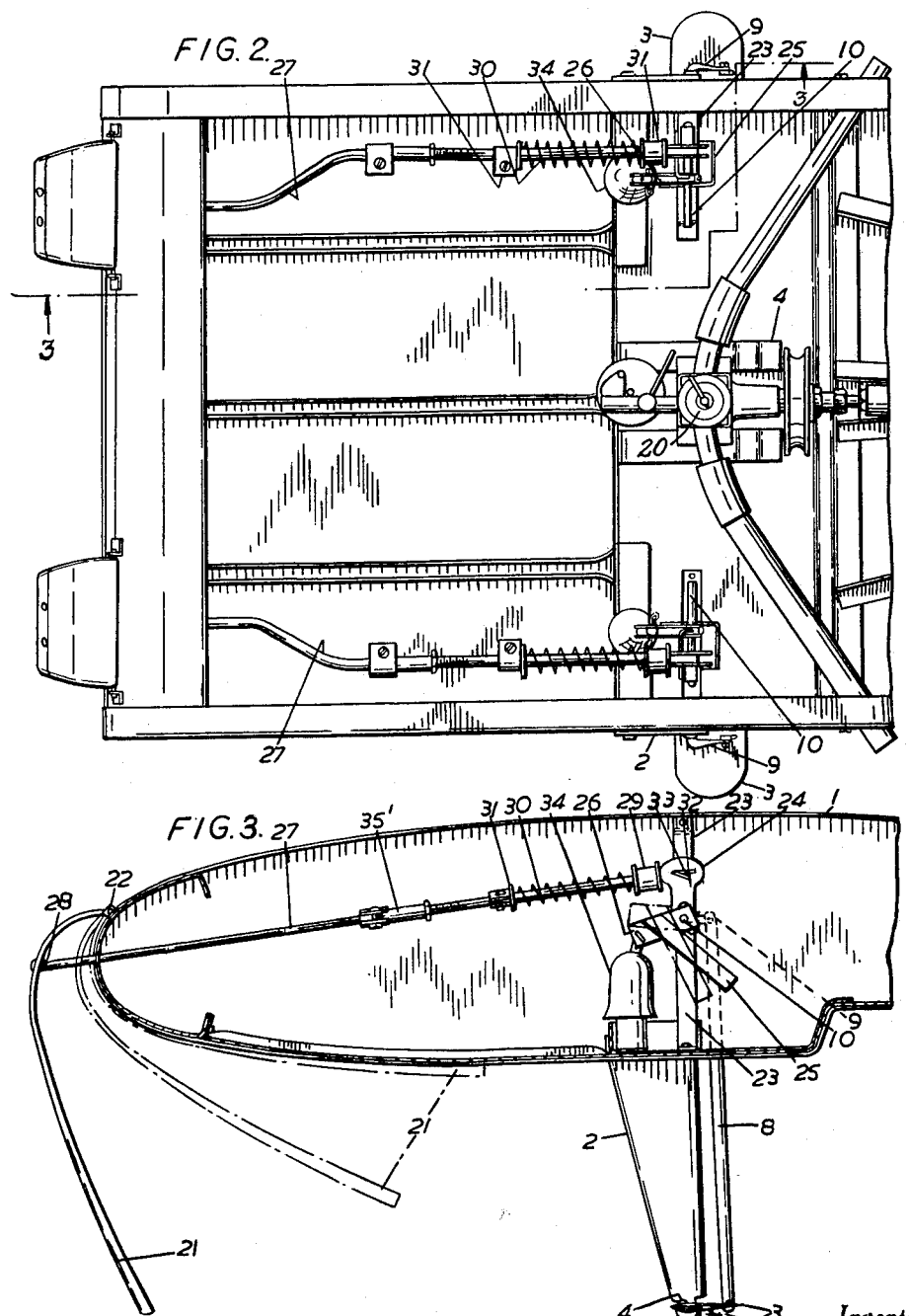

2,722,189
CRAFT ADAPTED TO TRAVEL ON WATER
Stephen William Hobday, New Malden, England
Application October 29, 1948, Serial No. 57,276
Claims priority, application Great Britain
October 29, 1947
7 Claims. (Cl. 114—66.5)

This invention relates to improvements in craft adapted to travel on water and having one or more hydrofoils for imparting a lift to the craft when it is making way.

Heretofore craft have been proposed in which variable pitch hydrofoils are pivotally mounted on struts extending downwardly from the craft so that at predetermined speeds the hydrofoils, which are submerged, lift all or a part of the hull of the craft above the surface of the water.

It has also been proposed in craft of this kind to vary automatically the pitch of the hydrofoils according to their depth beneath the surface by means of a controlling float or skid which skims the surface of the water. This float or skid may also be fitted with a device such as a dash-pot to retard its downward movement.

In craft utilising a float which skims the surface of the water to control the hydrofoils, the control movements may follow very rapidly one upon the other as would be the case when the craft is in a short sea, moreover the float undergoes a very wide range of movement as it passes from a trough to a wavecrest.

The object of the present invention is to provide a control device which whilst being readily responsive to the irregularities of water surface caused by waves, is capable of exercising a control in which large irregularities in water surface are averaged out to give a smooth control that is responsive to the general condition of the sea rather than an instantaneous condition in the vicinity of the control device.

A further object of the invention is to provide a control device by means of which the craft can be lifted clear of the water surface by an amount varying with the roughness of the water.

A further object of the invention is to provide control means which in the case of small waves will maintain the craft a small amount above the average water level, which in the case of larger waves will maintain the craft proportionately higher, and which in the case of very large waves will control the craft to follow the contour of the water surface.

In carrying the invention into effect according to a preferred embodiment, the craft is provided upon either side with a downwardly extending strut on which is pivotally mounted a hydrofoil. A third or stabilising hydrofoil may also be arranged near the bows or stern of the craft.

In a modification according to the invention the craft is provided on either side with a downwardly extending strut on which are fixedly mounted one or more hydrofoils. In this arrangement a pair of automatically variable hydrofoils are mounted on struts disposed ahead of the fixed hydrofoils and these leading hydrofoils are varied by a movement derived from the control device. Movement of the variable hydrofoils will cause the bows of the craft to rise or dip and thus vary the angle of incidence of the fixed hydrofoils.

The control device for varying the pitch of the hydrofoils is carried either in the bows of the craft or out ahead of the craft on a spar or like fixture. The control device is coupled to means, such as a servo-motor, for varying the angle of incidence of each of the variable pitch hydrofoils.

The invention will now be described with reference to the accompanying drawings in which:

Figure 1 is a perspective view of a craft equipped according to the invention.
Figure 2 is a partial plan view of Figure 1.
Figure 3 is a cross section on the line 3—3 of Figure 2.
Figure 4 is a front view of one of the control devices of the equipment of Figure 1.

In the drawings there is illustrated a craft with its hull 1 mounted on two pairs of struts 2, one pair being visible in Figure 1, while the other pair which is similar is mounted on the opposite side of the craft. A further strut 5 is mounted on the stern of the craft, which strut carries the screw 7 and also houses the drive to the screw. A variable pitch hydrofoil 3 is mounted on each pair of struts 2 and a fixed hydrofoil 6 is mounted on the rear strut 5. An engine 20 is shown in Figure 2 as mounted in the hull above the hydrofoils but this may if desired be positioned in the stern so as to be coupled directly to the screw drive.

The control device for each variable pitch hydrofoil 3 comprises a control member 21 which is pivotally secured to the hull above the water surface at 22; each control member tapers into a blade which is adapted to trail in the water. Each blade is given a transverse bend which increases in sharpness as the width of the taper diminishes to increase its rigidity and to cause it to run steadily through the water. According to the speed of the craft and to the amount of blade immersed, so the water pressure on the blade varies, and the blade is angularly displaced in relation to the hull to an extent dependent on the said water pressure.

The angular movement of each control member 21 is transmitted to the hydrofoils 3 by means of a linkage incorporating a lost motion device and a damping device. The linkage between each control member 21 and each hydrofoil 3 is similar and one such linkage will now be described with particular reference to Figures 2 and 3.

Mounted in bearings in a bracket 23 attached to the hull is a short shaft 10 which extends through the side of the hull and has secured thereto outboard of the hull, a crank 9. The crank 9 is pivoted to a connecting rod 8 which is in turn pivoted to the hydrofoil 3 so that on rotation of the shaft 10 the pitch of the hydrofoil is varied.

The shaft 10 carries inboard of the hull, three levers, 24, 25 and 26 rigidly fixed thereto. The lever 24, which serves as a medium for rocking the shaft 10, is connected by means of a rod 27, to a pivot 28 on the control member 21. The pivot 28 on the control member is offset from the pivot 22 of that member so that when the member is angularly displaced the rod 27 is moved in a direction approximately lengthwise of the craft. This movement is conveyed to the lever 24 through the collar 29.

It is desirable in order to prevent stalling of the hydrofoil that the range of movement of the hydrofoil 3 should be limited. It is however undesirable that the control member which has a larger range of movement should be similarly limited since should it encounter a large wave it is preferable that it should swing back against the hull of the craft without exercising any further effect on the pitch of the hydrofoils. In order that the pitch of the hydrofoil 3 is varied only over a predetermined part of the range of movement of the control member 21 the movement of the rod 27 is conveyed to the lever 24 through a spring 30, one end of which abuts against a collar 31 fixed to the rod.

In operation the rod 27 is moved under control of the control member 21 towards the stern of the craft. The spring 30 is of such stiffness that it does not appreciably compress until a predetermined load is applied thereto, the collar 29 is therefore also moved by the spring 30 towards the stern and moves with it the lever 24, this rocks the shaft 10 and the lever 25 fixed thereto until the lever 25 abuts against the bracket 23 whereupon further movement of the shaft 10 and lever 24 is arrested. So far rotation of the shaft 10 has served to vary the pitch of the hydrofoil 3 by means of the crank 9 and the connecting rod 8. On further movement of the rod 27 towards the stern, the spring 30 is compressed and the end 32 of the rod 27 moves along a slot 33 in the lever 24 which allows for a lost motion between the rod and the lever 24.

The third lever 26 is connected to a viscous fluid damping device 34 which serves to retard the rotation of the shaft 10 and thus slow down variations in pitch of the hydrofoils.

It sometimes happens that it is necessary to lift the hull over a wave which is larger than its preceding waves and a comparatively rapid variation in pitch of the hydrofoils is required. In such circumstances the operation of the spring 30 and slotted lever 24 differs from that described above in that owing to the retarding action of the damping device 34, the comparatively quick movement of the control member 21 and rod 27 causes the spring 30 to compress during the initial movement of the rod 27. The movement of the lever 24 being retarded, the end of the rod 27 moves along the slot 33 in the lever 24, and on reaching the end thereof rocks the lever 24, overcoming the retarding action of the damping device 34, the lever 24 being rocked until the stop 25 abuts the bracket 23.

In order that the movement of the hydrofoil 3 in relation to the movement of the control members 21 may be readily adjusted a threaded connecting device 35' may be incorporated in the rod 27.

It is desirable that for large craft provision should be made for exercising an over-riding manual control over the pitch of the hydrofoils 3. In this way the hydrofoils may be kept horizontal when the craft is starting from rest, or when it is preferred that the craft should travel with the hull nearer to the surface of the water than would be the case if the hydrofoils were subject solely to automatic control from the control members 21. Operation of the manual control would still allow independent movement of the control members 21 over the range of the slot 33 and this movement would compress the springs 30.

Owing to the taper given to the blades of the control members, the immersed surface area of the blade increases and decreases very rapidly as irregularities of water surface are encountered. This has the effect of making the movement of the control members 21 sensitive to small variations in the amount of blade immersed.

Whilst the invention has been described primarily in connection with sea-borne craft it is also applicable to craft which are adapted to become airborne. For example, variable pitch hydrofoils automatically controlled in accordance with the invention may be fitted to flying boats or seaplanes to assist take-off.

I claim:

1. A craft adapted to travel on water comprising a plurality of hydrofoils for imparting a lift to the craft when it is making way, a plurality of control members pivoted to the bows of the craft, said control members being curved with their lower ends directed towards the rear of the craft and formed with blades arranged to be immersed in the water, the blades being shaped to present a downwardly tapering surface normal to the direction of movement of the craft and being angularly displaceable in a fore-and-aft plane of the craft, and operative connecting means between said control members and said hydrofoils whereby the said control members automatically control the pitch of the hydrofoils in accordance with the water pressure on the blades when the craft is making way.

2. A craft as claimed in claim 1 in which the blades of the control members are provided with a transverse bend which increases in sharpness as the width of the taper diminishes.

3. A craft adapted to travel on water comprising a plurality of hydrofoils for imparting a lift to the craft when it is making way, a plurality of control members pivoted to the bows of the craft, said control members being formed with blades arranged to be immersed in the water and being angularly displaceable in a fore-and-aft plane of the craft, a plurality of lever systems and an operative connection between each control member and each lever system, and between each lever system and each hydrofoil, whereby the said control members automatically control the pitch of the hydrofoils in accordance with the water pressure on the blades when the craft is making way.

4. A craft as claimed in claim 3 in which each lever system includes a lost motion device whereby movement of the control members is permitted to take place beyond the range of movement of the hydrofoils.

5. A craft adapted to travel on water comprising a plurality of hydrofoils for imparting a lift to the craft when it is making way, a plurality of control members pivoted to the bows of the craft, said control members being formed with blades arranged to be immersed in the water and being angularly displaceable in a fore-and-aft plane of the craft, a plurality of lever systems, an operative connection between each control member and each lever system, and between each lever system and each hydrofoil, a stop for each lever system, the connection between each control member and each lever system including a spring which is adapted to cause the initial movement of each control member to rock its associated lever system, whereby movement of the control member beyond the range of movement of the lever system takes place relatively to the lever system by compression of the spring.

6. A craft as claimed in claim 5 in which damping means are provided in the transmission between the control members and the hydrofoils whereby movement of the hydrofoils is retarded.

7. A craft adapted to travel on water comprising a plurality of hydrofoils for imparting a lift to the craft when it is making way, a plurality of control members pivoted to the bows of the craft, said control members being formed with blades arranged to be immersed in the water and being angularly displaceable in a fore-and-aft plane of the craft in accordance with the speed of the craft and the extent of immersion of each blade, a plurality of lever systems, a connecting rod forming an operative connection between each control member and each lever system, an operative connection between each lever system and each hydrofoil, a stop for limting the range of movement of each lever system, damping means for retarding the movement of each lever system, a spring interposed between each connecting rod and each lever system for causing slow movement of the connecting rod to rock the lever system, a pin and slot connection between each connecting rod and each lever system, the pin being biassed to one end of the slot by the spring, the said spring being of predetermined stiffness in relation to the damping means whereby an abnormally rapid movement of the connecting rod compresses the spring, and causes the pin to engage the other end of the slot to rock the lever system against the retarding action of the damping means.

References Cited in the file of this patent

UNITED STATES PATENTS

| | | |
|---|---|---|
| 857,951 | Meacham | June 25, 1907 |
| 1,186,816 | Meacham | June 13, 1916 |
| 1,475,869 | Petrie | Nov. 27, 1923 |
| 1,634,257 | Garro | July 5, 1927 |
| 2,176,469 | Moueix | Oct. 17, 1939 |
| 2,387,907 | Hook | Oct. 30, 1945 |
| 2,400,782 | Randall | May 21, 1946 |
| 2,457,393 | Muffly | Dec. 28, 1948 |